US008121046B2

(12) United States Patent  (10) Patent No.: US 8,121,046 B2
Morrison et al.  (45) Date of Patent: Feb. 21, 2012

(54) EFFICIENT BLOCK ERROR RATE EVALUATION IN A FEMTO CELL NETWORK

(75) Inventors: Patrick Shane Morrison, Marietta, GA (US); Kurt Donald Huber, Kennesaw, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 579 days.

(21) Appl. No.: 12/276,111

(22) Filed: Nov. 21, 2008

(65) Prior Publication Data

US 2010/0130189 A1   May 27, 2010

(51) Int. Cl.
 H04J 3/14 (2006.01)
 G06F 11/00 (2006.01)
 H04W 4/00 (2009.01)
(52) U.S. Cl. .................. 370/252; 370/333; 370/338
(58) Field of Classification Search .......... None
 See application file for complete search history.

(56) References Cited

U.S. PATENT DOCUMENTS

| 7,107,013 | B2 * | 9/2006 | Qiu ............................ 455/67.13 |
| 7,539,497 | B2 * | 5/2009 | Beale .......................... 455/451 |
| 7,907,907 | B2 * | 3/2011 | Qiu ............................ 455/67.13 |
| 2004/0116142 | A1 * | 6/2004 | Wang et al. ................... 455/522 |
| 2004/0132475 | A1 * | 7/2004 | Ishii et al. .................... 455/522 |
| 2009/0047961 | A1 * | 2/2009 | Kim ............................. 455/436 |
| 2010/0069072 | A1 * | 3/2010 | Gogic et al. .................. 455/436 |

* cited by examiner

*Primary Examiner* — Chi Pham
*Assistant Examiner* — Soon-Dong Hyun (57) ABSTRACT

System(s) and method(s) are provided to evaluate uplink or downlink block error rate (BLER) performance in a femto cell network. Data on uplink or downlink communication of data blocks for a set of femto access points (APs) is aggregated, wherein the selected is a fraction of a larger set of provisioned femto access points. The set of femto APs can be selected based at least in part on various criteria which can ensure that operation of the selected set of femto APs is a statistically meaningful representation of operation of the larger set of femto APs. Composite alarm thresholds facilitate triggering alarm(s) when a predetermined portion of the aggregated data reveal a BLER failure condition. Composite thresholds can be generated through analysis of aggregated uplink/downlink (UL/DL) BLER data for a set of femto APs.

25 Claims, 9 Drawing Sheets

EFFICIENT BLOCK ERROR RATE EVALUATION IN A FEMTO CELL NETWORK

TECHNICAL FIELD

The subject innovation relates to wireless communications and, more particularly, to efficiently gauging block error rate (BLER) performance of provisioned femto access points in a femto cell network.

BACKGROUND

Femto cells—building-based wireless access points interfaced with a wired broadband network—are generally deployed to improve indoor wireless coverage, and to offload a mobility radio access network (RAN) operated by a wireless service provider. Improved indoor coverage includes stronger signal and improved reception (e.g., voice or data), ease of session or call initiation, and session or call retention as well. Offloading a RAN reduces operational and transport costs for the service provider since a lesser number of end users utilizes over-the-air radio resources (e.g., radio frequency channels), which are typically limited.

Coverage of a femto cell, or femto access point (AP), is generally intended to be confined within the bounds of an indoor compound (e.g., a residential or commercial building) in order to mitigate interference among mobile stations covered by a macro cell and terminals covered by the femto AP. Additionally, confined coverage can reduce interference among terminals serviced by disparate, neighboring femto cells as well. Femto cells typically operate in licensed portions of the electromagnetic spectrum, and generally offer plug-and-play installation; e.g., automatic configuration of femto AP subsequent to femto cell subscriber registration with a service provider. Coverage improvements via femto cells can also mitigate customer attrition as long as a favorable subscriber perception regarding voice coverage and other data services with substantive delay sensitivity is attained. In addition, a richer variety of wireless voice and data services can be offered to customers via a femto cell since such service offerings do not rely primarily on mobility RAN resources.

Substantial exploitation of the foregoing efficiencies provided by femto cells depends at least in part on adequate performance or service of a femto cell network, which can be achieved or exceeded through monitoring technical and commercial aspects of operation of the femto cell network. In contrast to standard telecommunication networks designed and deployed for outdoors macro coverage, like a Universal Mobile Telecommunication System macro network or a Global System for Mobile Communication macro network, in which various performance metrics associated with voice quality and data session quality, such as block error rate, packet loss rate, lost calls, etc., can be monitored for up $10^3$-$10^5$ base stations per network management unit (e.g., a radio network controller), in a femto coverage deployment a substantially larger number of access points is to be monitored. Thus, increasing the complexity of assessing quality of voice calls, e.g., via BLER, and quality of data sessions. Aspects of monitoring a femto cell network such as assessing voice calls and data session quality, measurement(s) aggregation, data storage, report generation, etc., can lead to cumbersome (e.g., complicated performance rules) and expensive implementations which can hinder achieving or exceeding adequate operation quality.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

System(s) and method(s) are provided to evaluate uplink or downlink block error rate (BLER) performance in a femto cell network. Data on uplink or downlink communication of data blocks for a set of femto access points (APs) is aggregated, wherein the selected is a fraction of a larger set of provisioned femto access points. The set of femto APs can be selected based at least in part on various criteria that can ensure operation of the selected set of femto APs is a statistically meaningful representation of the operation of the larger set of femto APs. Composite alarm thresholds facilitate triggering alarm(s) when a predetermined portion of the aggregated data reveal a BLER failure condition. Composite thresholds, which include a threshold for BLER failure, or failure counts, and a threshold for a portion of aggregated that display a BLER failure, can be generated through analysis of aggregated UL/DL BLER data for a set of femto APs.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "connector," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer. Likewise, the terms "femto cell access point" and "femto access point" are also utilized interchangeably.

Figure 1:
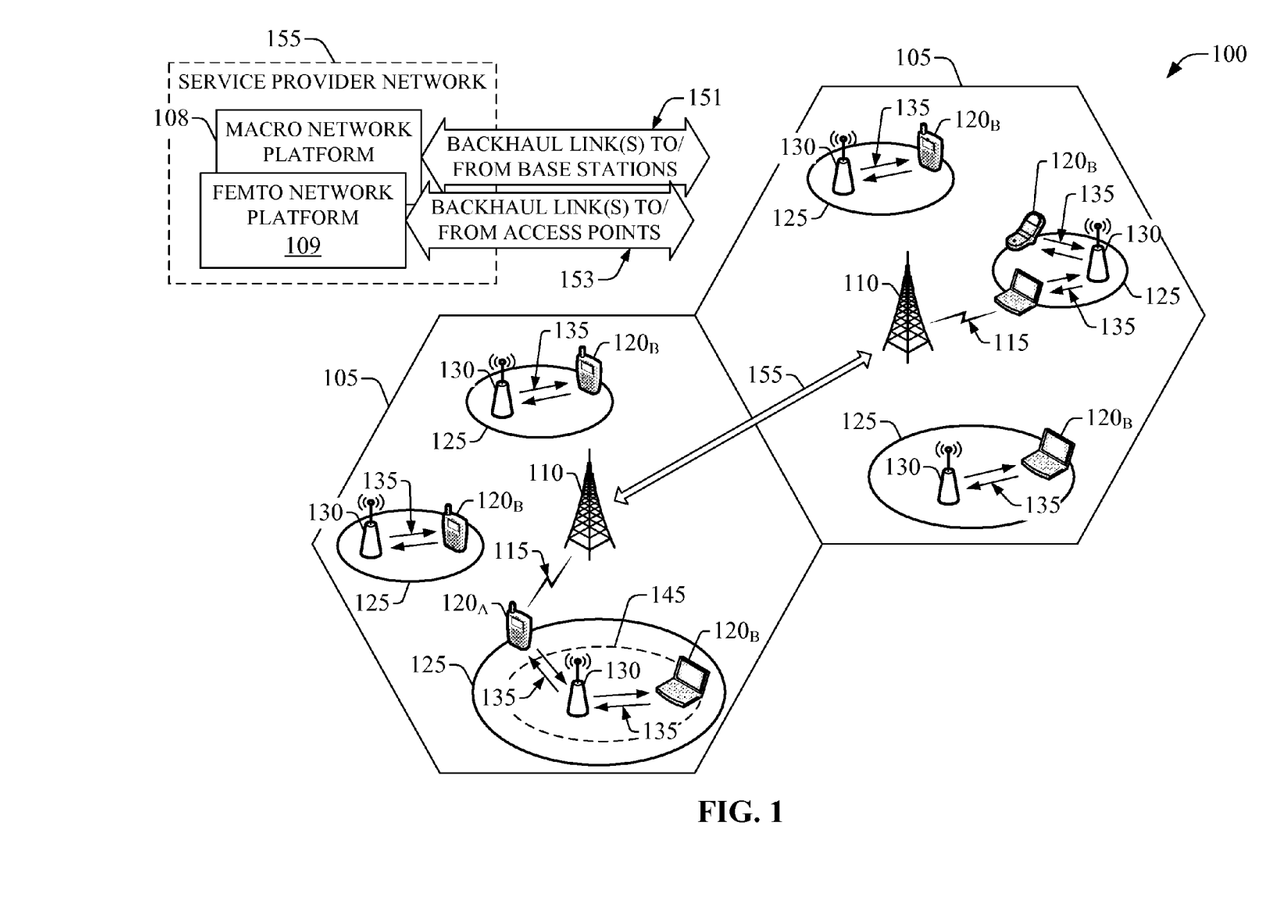
FIG. 1 illustrates a wireless environment that includes macro cells and femto cells for wireless coverage in accordance with aspects described herein.

Referring to the drawings, FIG. 1 illustrates a wireless environment that includes macro cells and femto cells for wireless coverage in accordance with aspects described herein. In wireless environment 100, two areas 105 represent "macro" cell coverage, each macro cell is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in outdoors locations. An over-the-air wireless link 115 provides such coverage, the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates via backhaul link(s) 151 with a macro network platform 108, which in cellular wireless technologies (e.g., 3rd Generation Partnership Project (3GPP) Universal Mobile Telecommunication System (UMTS), Global System for Mobile Communication (GSM)) represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macro coverage cell 105, a set of femto cell 125 served by respective femto access points (APs) 130 can be deployed. While in illustrative wireless environment 100 three femto cells are deployed per macro cell, aspects of the subject innovation are geared to femto cell deployments with substantive femto AP density, e.g., $10^4$-$10^8$ femto APs 130 per base stations 110. A femto cell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Coverage area typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompass a setting that can span about 5000 sq. ft.

A femto AP 130 typically serves a few (for example, 1-5) wireless devices (e.g., subscriber station $120_B$) within confined coverage area 125 via a wireless link 135 which encompasses a downlink and an uplink. A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject innovation, part of the control effected by femto AP 130 measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces like Iu-CS, Iu-PS, Gi, Gn. It is to be noted that substantially all voice or data active sessions associated with subscribers within femto cell coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., cell 105) enters femto coverage (e.g., area 125), the subscriber station (e.g., UE $120_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). Attachment attempts are a part of procedures to ensure mobility, so voice calls and data sessions can continue even after a macro-to-femto transition or vice versa. It is to be noted that UE $120_A$ can be employed seamlessly after either of the foregoing transitions. In addition, femto networks typically are designed to serve stationary or slow-moving traffic with reduced signaling loads compared to macro networks. A femto service provider (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femto cell 125, and incoming voice and data traffic are paged and routed to the subscriber through the femto AP 130. To facilitate voice and data routing, and control signaling as well, successful attachment can be recorded in a memory register, e.g., a Visitor Location Register (VLR), or substantially any data structure stored in a network memory. It is to be noted also that packet communication (e.g., voice and data traffic, and signaling) typically paged/routed through a backhaul broadband wired network backbone 140 (e.g., optical fiber backbone, twisted-pair line, T1/E1 phone line, digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). Through backhaul pipe 153, a femto AP 130 can handle substantially any quality of service (QoS) for heterogeneous packetized traffic (e.g., various, multiple packet flows). In an aspect of the subject innovation, femto AP 130 can display status indicators for power, active broadband/DSL connection, and gateway connection. In another aspect, no landline is necessary for femto AP 130 operation.

Figure 2:
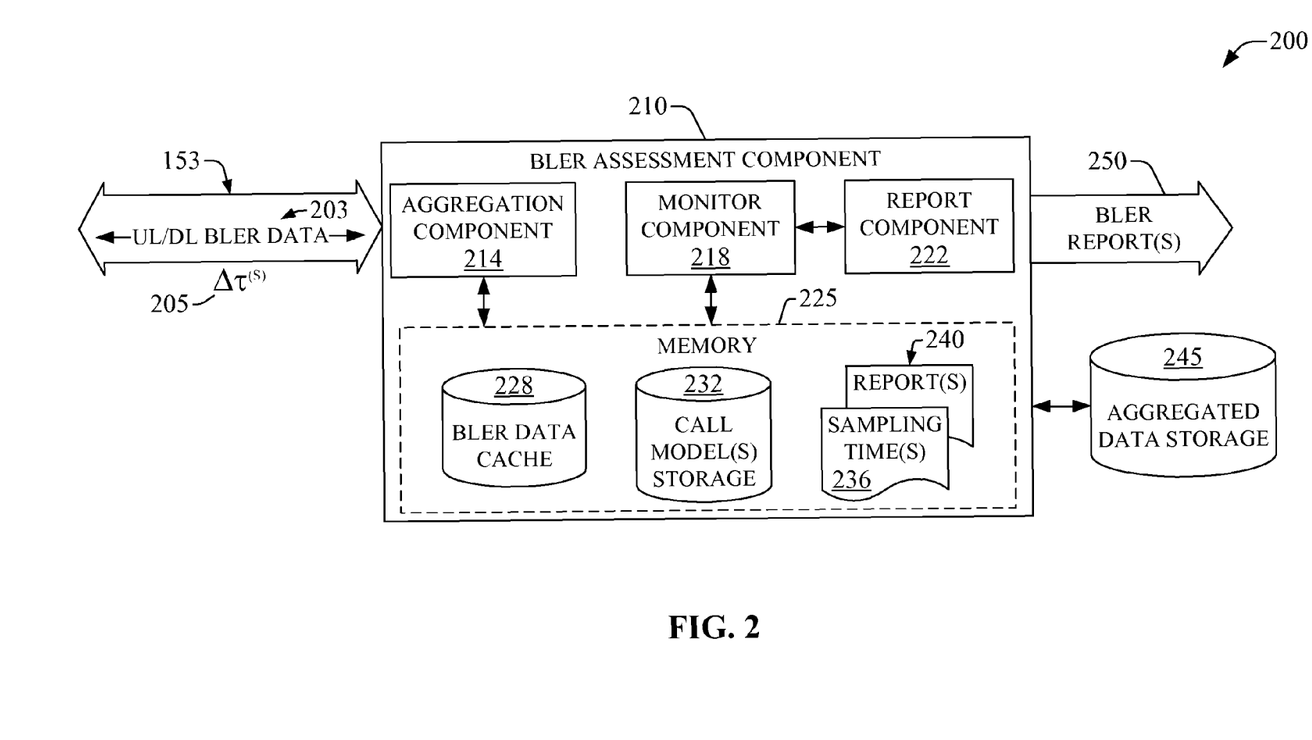
FIG. 2 illustrates a block diagram of an example system that exploits data aggregation to assess block error rates (BLERs) for uplink (UL) and downlink (DL) communication in a femto cell network in accordance with aspects described herein.

FIG. 2 illustrates a block diagram of an example system 200 that exploits data aggregation to assess block error rates (BLERs) for uplink (UL) and downlink (DL) communication in a femto cell network (e.g., deployed femto APs 130) in accordance with aspects described herein. It is noted that example system 200 also can be utilized to assess bit error rate, packet error rate in a femto cell network. Block error rate (BLER) assessment component 210 can receive UL/DL BLER data 203 via backhaul link 153; the UL/DL BLER data 203 is measured at a served femto access point (e.g., femto AP 130), and can include ACK (acknowledge) and NACK (not acknowledge) indications, and cyclic redundancy check (CRC) values. In an aspect, UL/DL BLER data 203 can include data from substantially all femto APs associated with one or more network management components (e.g., a radio network controllers, or a gateway nodes); it should be appreciated that the number of substantially all femto APs can range from $10^5$-$10^8$. In another aspect of the subject innovation, aggregation component 214 selects a portion of the received UL/DL BLER data 203 associated with substantially all served APs; the portion of data is determined so as to provide a statistically significant representation of BLER for a deployed femto network. Thus, aggregation component 214 reduces the scope of the received UL/DL BLER data 203 that is effectively monitored. In an aspect, aggregation component 214 selects a portion that typically is O(1%); e.g., 1-3%. However, it should be appreciated that aggregation component 214 can select any portion of data up to the whole available data from a whole set of served femto APs for which data is received. At least one advantage of data aggregation directed to UL/DL BLER performance assessment in a femto network is that the aggregation of collected data, e.g., aggregation at a femto gateway component or node, allows monitoring millions of femto access points instead of inspecting or probing individual femto APs.

Aggregation component 214 can select a set of served APs in accordance with various criteria, which can include at least one of operational technology of femto APs; marketplace e.g., served customer type, served application types, geographic location, of femto AP deployment, operational radio frequency (RF) bands in which a femto AP operates; interference environment(s) of a femto AP, e.g., femto APs in highly populated areas with high density of operating wireless devices; or the like. Additionally, aggregation component 214 can retain a fraction of the portion of data that is aggregated. Such fraction of data can be retained in memory element BLER data cache 228; the cached data stored therein can serve various ends, e.g., it can serve as a training set for generation of performance rules, it can server to conduct sampling test(s) for data integrity, to ensure that aggregated data is not corrupted, etc. In an aspect, BLER assessment component 210 can flush the BLER data cache periodically, or at predetermined intervals. Aggregation component 214 can retain the portion of selected UL/DL BLER data 203 in aggregated data storage 245. In an aspect, aggregation of data takes place in a femto network platform component such as a memory functionally coupled to a gateway node. To efficiently retain substantive volumes ($10^2$-$10^5$ TB) of data associated received and selected UL/DL BLER data 203, aggregation component 214 can compress data to be aggregated through lossless wavelet compression, or substantially any data compression method.

Received UL/DL BLER data 203 is sampled in accordance with a sampling time $\Delta \tau^{(S)}$ 205, which can be based at least in part on parameters for call model(s), which are retained in call model(s) storage 232; as an illustrative example, $\Delta \tau^{(S)}$=2 sec. Such parameters can include average hold time for a subscriber maintaining a conversation on a served femto access point, and voice activity factor, which determines a volume of active voice data carried over to and from a serving femto access point, from both a mobile device and a femto network platform (e.g., femto network platform 109). As an example, average hold time can be 4 minutes, or 240 seconds, and voice activity factor (VAF) can be 0.675, which is an illustrative example of VAF; it should be appreciated that VAFs depend at least in part on the language a voice call is conducted. The latter parameters and a sampling time of 2 sec provide with 120 data samples, which are scaled through VAF to 78 samples, out of which a portion, e.g., 10% or 7.8, is aggregated via aggregation component 214. It should be appreciated that, in an aspect, monitor component 218 can exploit, at least in part, collected UL/DL BLER data 203 to generate call model(s), e.g., determine an average hold time and a VAF, that can be retained in call model(s) storage 232 in addition to sampling times associated therewith; sampling times can be retained in sampling time(s) 236 for further utilization for data collection.

Additionally, sampling time $\Delta \tau^{(S)}$ 205 can be determined as a function of a coding rate. Such election, or determination, can ensure that the number of chips, bits, or symbols, are substantially the same as modulation and coding rate is adaptively granted to subscriber(s); it is noted that while for voice calls, coding rate is generally fixed throughout a conversation, for data sessions the coding rate can vary; for example, to adapt to radio link conditions in a femto coverage area.

In example system 200, a monitor component 218 processes aggregated data retained in aggregated data store 245 to generate BLER values, which are conveyed in a BLER report 250 generated trough report component 222. BLER report 250 can be delivered to various operational layers within a mobile network; e.g., business layer, operation and maintenance layer, etc. Monitor component 218 can monitor aggregated data in real time mode, in which instance report component 222 generates a BLER report as a data stream. Additionally, monitor component 218 can process aggregated data in batches, or in a scheduled manner, via evaluation of parcels of aggregated data that correspond to a specific time intervals, e.g., an hour, a day, a week, a month, or the like. Report component 222 generates BLER report(s) 250 accordingly. Generated BLER reports 250 are retained in memory 225 in memory element report(s) 240.

It should be appreciated that BLER assessment component 210 can be functionally connected to a processor (not shown) which can confer, at least in part, the described functionality of BLER assessment component 410 and substantially any other component included therein or functionally connected to BLER assessment component 210. The processor (not shown) can execute code instructions stored in a memory, or memory component, e.g., memory 225, to provide such functionality.

Figure 3:
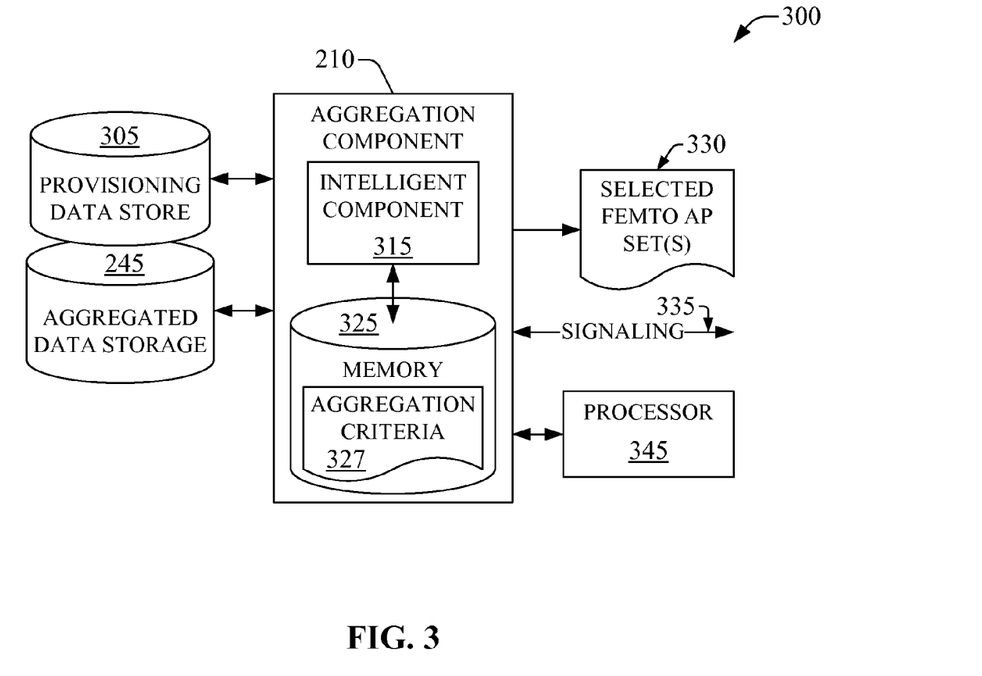
FIG. 3 illustrates a block diagram of an example embodiment of an aggregation component in accordance with aspects described herein.

FIG. 3 illustrates a block diagram of an example embodiment 300 of an aggregation component 210 in accordance with aspects described herein. An intelligent component 315 can reside within aggregation component 210 and gather data related to provisioning femto access points that can be monitored for BLER performance based at least in part on aggregation criteria 327. In an aspect, intelligent component 315 can extract data from a provisioning data store 305, which can reside within a femto network platform (e.g., femto network platform 109). It is noted that intelligent component 315 also can reside within substantially any component of macro network platform 108 or femto network platform 109.

As discussed above, aggregation criteria 327 can include at least one of operational technology of femto APs; marketplace, e.g., served customer type, served application types, geographic location, of femto AP deployment, operational radio frequency (RF) bands in which a femto AP operates; interference environment(s) of a femto AP, e.g., femto APs in highly populated areas with high density of operating wireless devices; or the like. In addition, femto service subscriber aspects also can be included in the aggregation criteria; for instance, aggregation criteria can include call usage (e.g., voice call placed or received, or initiated data session(s)). It should be appreciated that intelligent component 315 utilizes aggregation criteria 327 to drive selection of served femto access points, e.g., selected femto AP set(s) 330, that provide a rich representation of network utilization. Signaling 335 can facilitate communication related to operation of aggregation component 210 with other macro or femto network components. In an aspect, selection can obey at least three paradigms that can provide statistically representative data. First, femto access points are selected in a random fashion, with orthogonal or nearly orthogonal operation patterns; it is noted that when two orthogonal patterns are orthogonal, metrics or pointers that characterize service are non-overlapping, e.g., a high-end prosumer can be allocated bandwidths that are substantially dissimilar that those associated with a low-end consumer. Randomization with orthogonalization can provide substantive variety of in the aggregated data retained in aggregated data storage 245. Second, femto access points are selected in accordance with directed selection, wherein selected femto AP set(s) 330 include served femto APs that present substantial overlap in operational or service metrics. Directed selection can provide rich details of operation in non-ideal situations, such as a set or prosumers competing for network resources while maintaining call session within a substantially noisy environment; e.g., a customer representative conducting calls in a call center. Third, distributed selection, wherein femto access points are selected according to a distribution of operational or service metrics that leads to a distribution of selected femto APs. In an aspect, the distribution can present a maximum with respect to a predetermined metric like capacity, or radio link conditions, in which the majority of selected femto APs display the predetermined metrics. Third paradigm bridges the first and second paradigms for femto AP selection for data aggregation.

To generate selected femto AP set(s) 330 that provide a rich, statistically meaningful data profile for UL/DL BLER data 203, intelligence component 315 can exploit artificial intelligence (AI) methods to infer (e.g., reason and draw a conclusion based upon a set of metrics, arguments, or known outcomes in controlled scenarios). Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., collected UL/DL BLER data 203.

In particular, to generate selected femto AP set(s) 330, intelligent component 315 can employ one of numerous methodologies for learning from data and then drawing inferences from the models so constructed. Such methodologies can be retained in memory 325 (not shown). For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited.

Aggregation component 210 can be functionally connected to processor 345, which can confer, at least in part, the described functionality of aggregation component 210 and substantially any other component included therein or functionally connected to aggregation component 410. Processor 345 can execute code instructions stored in a memory, or memory component, e.g., memory 325, to provide such functionality.

Figure 4:
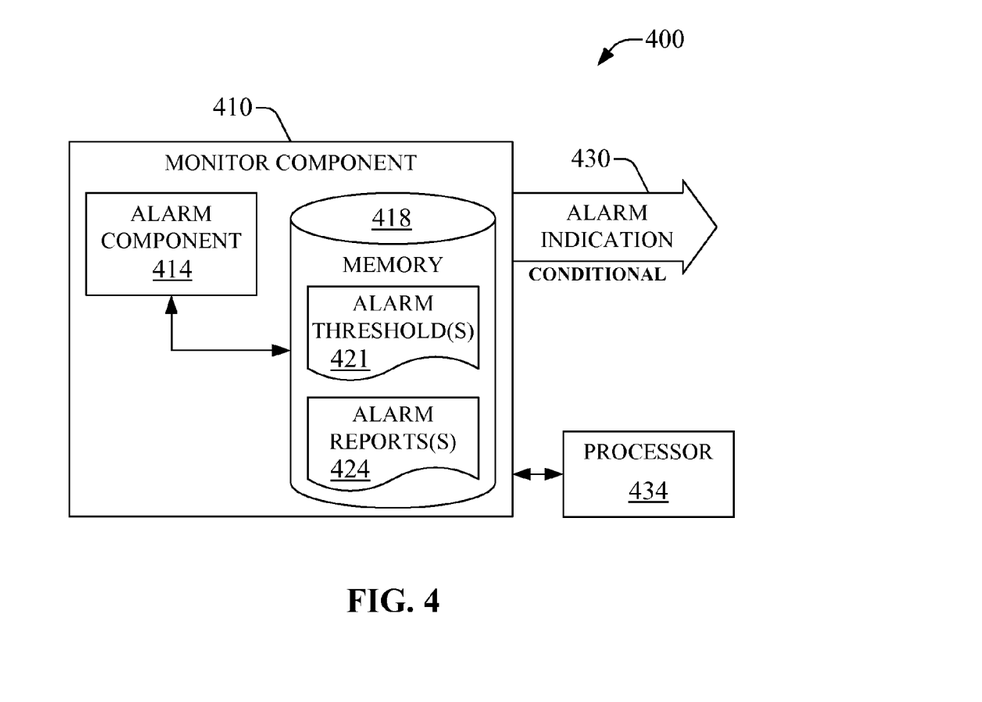
FIG. 4 is a block diagram of an example system that facilitates generation of performance rule(s) to gauge service or operation quality of a femto cell network in accordance with aspects described herein.

FIG. 4 is a block diagram of an example embodiment of a monitor component that facilitates generation of an alarm when BLER performance is above configured thresholds in accordance with aspects described herein. In embodiment 400, monitor component 410 includes an alarm component 414, which can exploit generated BLER values for aggregated UL/DL BLER data 203 processed through monitor component 410 to generate an alarm indication 430. Alarm component 414 exploits alarm thresholds 421, which in an aspect of the subject innovation can be composite objects that include (1) a failure threshold for BLER values, and (2) a performance threshold for a set of aggregated data, e.g., retained in aggregated data storage 245. These alarm thresholds 421 are configurable values that determine a boundary at which BLER performance, or voice quality, of a femto cell network starts to degrade. Alarm thresholds 421 are typically configured by a network operator, or service provider, and can be time- and space-dependent. Values of alarm threshold(s) 421 can be determined based at least in part on (I) analysis of performance of a control, or training set of femto APs, (II) subscriber type, historic data, which can include rate of previous alarm condition(s), and (III) heuristics, particularly at early stages of deployment of a femto cell network.

In an aspect, a failure threshold for BLER applies to a set of collected samples on either UL or DL communication of transport blocks. It should be appreciated that UL or DL values can have disparate threshold values for BLER failure. When a set of samples, determined at least in part by an aggregation rate, e.g., the portion of data that is aggregated, is above a BLER failure threshold, a failure record is generated within a BLER report (e.g., BLER report(s) 250), which can be produced through report component 222. As an example, with the foregoing parameters of 4 minutes for average hold time and 2 sec of sampling time (e.g., $\Delta \tau^{(S)}$ 205), 78 samples are aggregated when 10% of data originating from served femto APs is aggregated, when 8 samples in a 4 minute circuit switched speech have a BLER above 2, a BLER failure is counted. In another aspect, a performance threshold gauges a number of BLER failure records, such that when a fraction (e.g., 2%) of reported BLER is in failure, alarm generation is triggered. It should be appreciated that, in an aspect of the subject innovation, BLER failure is in part permitted, but only to the extent that BLER performance as determined through BLER reports (e.g., BLER report(s) 250) for a portion of the set of femto APs is below the performance threshold.

Alarm indication 430 can be conveyed to a macro or femto network management component (e.g, an operations and maintenance (O&M) server), or a device (e.g., a mobile of a network administrator) that operates in the macro or femto cell network. In addition, alarm indication 430 can be configurable, with the format and content dependent at least in part upon the intended recipient (e.g., operator or component) of the indication. As an example, alarm indication 430 and can be embodied in a set of multi-bit words, a graphical or audible token, a short message service (SMS) communication, a multimedia message service (MMS) communication, an email message, an instant message, and so on. At least one advantage of alarm indication 430 and delivery thereof is that operation and maintenance personnel or other entities, human or otherwise, related to operation of a femto network can be alerted either in real time or through collected alarm reports, or both, when fault conditions related to BLER exist or are present in the femto network instead of instead of manually investigating one femto AP at a time.

Alarm component 414 also can generate and retain alarm report(s) 424, e.g., which can include analysis, e.g., accomplished via an analysis component (not shown), of sources of triggered alarms. Analysis included in alarm report(s) can comprise projection analysis, or forecast, of BLER failure for various set of femto access points that are utilized for data aggregation.

It should be appreciated that monitor component 410 can be functionally connected to processor 434 which can confer, at least in part, the described functionality of monitor component 410 and substantially any other component included therein or functionally connected to monitor component 410. Processor 434 can execute code instructions stored in a memory, or memory component, e.g., memory 418, to provide such functionality.

Figure 5:
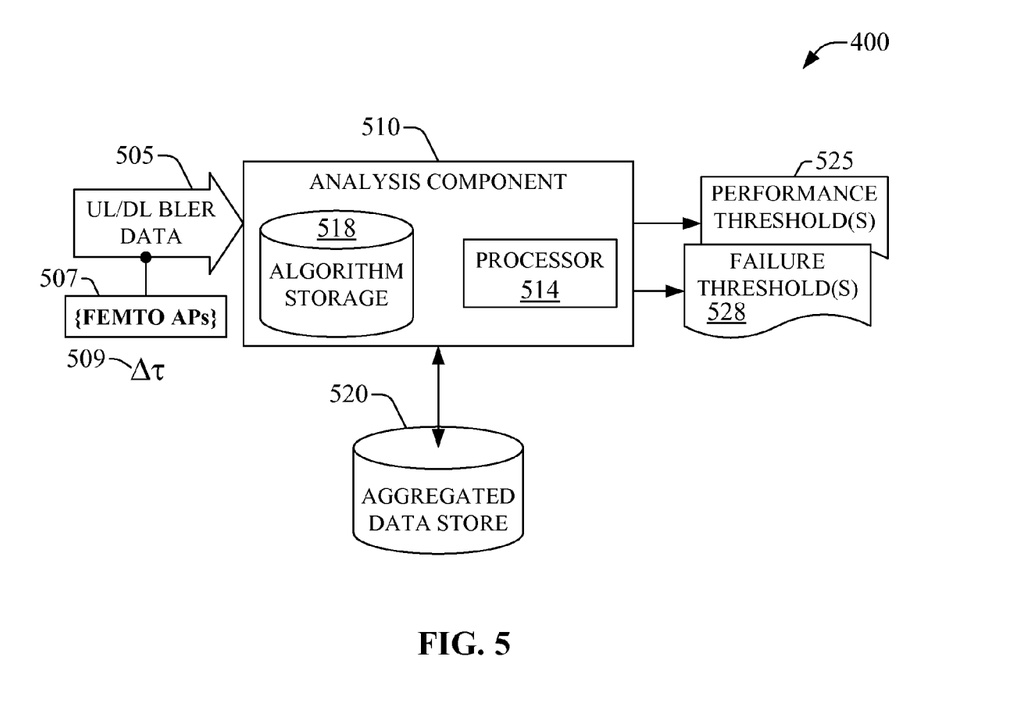
FIG. 5 is a block diagram of an example system that customizes performance rule set(s) for subscriber segments in accordance with aspects of the subject innovation.

FIG. 5 is a block diagram of an example system 500 that facilitates generation of BLER failure threshold(s) in accordance with aspects described herein. In system 500, analysis component 510 receives UL/DL BLER data 405 for a set of femto APs 507 for a specific time interval $\Delta\tau$ 509. It should be appreciated that the set of femto APs can be selected, or generated, in the manner described above in connection with example embodiment 300. Analysis component 510 can reside within a BLER assessment component (e.g., component 210), or within substantially any component of macro network platform 108 or femto network platform 109. The set of femto APs 507 can include a portion of the deployed femto APs in a femto cell network. The collection time interval $\Delta\tau$ 509 can span a continuous term, or can be a discretized time interval (e.g., a set of predetermined time slots, such as the last 12 Thursdays; a set of 4 weekends, which can facilitate adjustment of a performance rule(s) to increased residential femto cell traffic; or the last 20 night-calling periods, e.g., weekdays from 6:00 p-6:00 a; and so on). To analyze the received operational data 505, analysis component 510 can aggregate it in aggregated data store 520. Analysis component 510 analyzes the aggregated data to generate composite alarm threshold(s), which includes performance threshold(s) 525 and failure threshold(s) 528.

Analysis component 510 can apply substantially any mathematical algorithm for analysis of time-series from disparate sources (e.g., each access point in femto APs set 507). The algorithms can reside in algorithm storage 518, or in substantially any component within macro network platform 108 or femto network platform 109 that can be functionally connected to analysis component 510. In addition, analysis component 510 can include a processor 514, or be functionally connected to a processor, which can confer, at least in part, analysis component 510 its functionality.

In an aspect, UL/DL BLER data 505 can be provided for analysis by BLER assessment component 210, wherein data analysis is directed towards identification of standards of normal voice or data session operation of the femto cell network for various conditions. Data analysis can include can include computation of statistics (e.g., average, variance and standard deviation, covariance matrices, or the like), and time and space correlations of collected UL/DL BLER data 505, and correlations extant therein. In addition, data analysis can include extraction of patterns or clusters of BLER activity and performance within the collected data. In an aspect of the subject innovation, determination of failure threshold(s) 528 and performance threshold(s) 525 can be conducted iteratively in order to reach stable, converged values. The following illustrative example describes the latter. When a current value a current failure threshold 528 is determined, analysis component 510 checks, as part of data analysis, whether the determined current BLER failure threshold is within a tolerance of a previous BLER failure threshold. Such tolerance can determine when a determination of BLER failure threshold has converged to a stable value that is characteristic of the selected set of femto access points. Tolerance can be configured by a network operator, or service provider. When analysis component 510 determines that a difference among the current threshold and the previously determined threshold is larger that the tolerance, the select set of femto access points 507 is augmented. When augmentation results in a number of elements in the selected set of femto APs 507 exceeding a cutoff value, the current failure threshold is retained. Conversely, analysis component 510 determines a new current failure thresholds and compares the new valued with the previous failure threshold, which corresponds to the formerly computed failure threshold. Subsequently, data analysis 510 compares the difference between current and previous failure value, when the difference is within the tolerance, the process stops and the current failure value (e.g., failure threshold 528) is retained in a memory. Likewise, if a foregoing cutoff is reached, the current failure value (e.g., failure threshold 528) also is retained in a memory. Otherwise, analysis component 510 continues iteration until either a tolerance level is reached, or the cutoff exceeded.

In view of the example systems described above, example methodologies that can be implemented in accordance with the disclosed subject matter can be better appreciated with reference to flowcharts in FIGS. 6-9. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. Further yet, two or more of the disclosed methodologies can be implemented in combination with each other, to accomplish one or more features or advantages herein described. It should be further appreciated that the methodologies disclosed throughout the subject specification are capable of being stored on an article of manufacture to facilitate transporting and transferring such methodologies to computers for execution by a processor or for storage in a memory.

Figure 6:
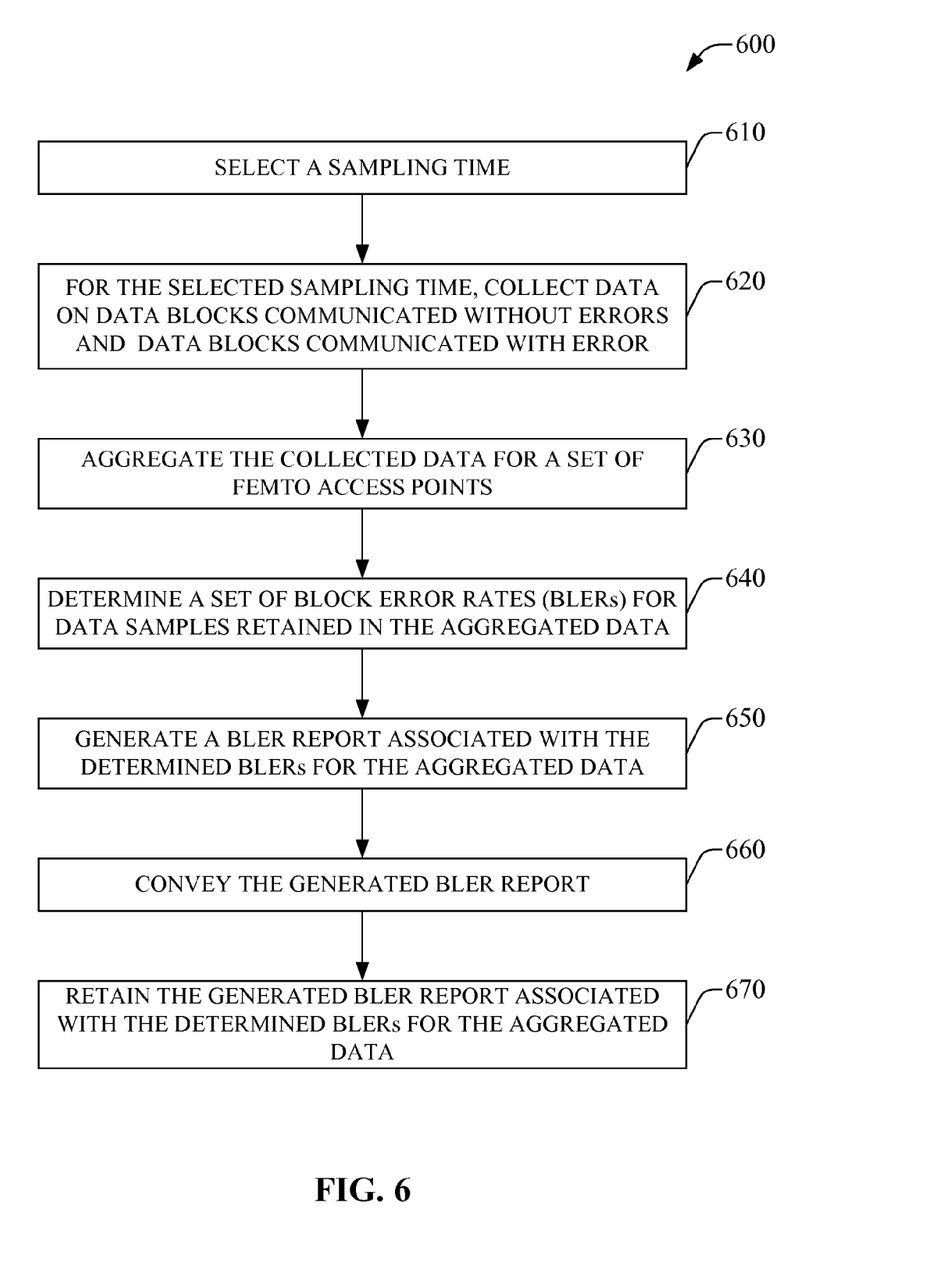
FIG. 6 is a flowchart of an example method for conducting a block error rate assessment according to aspects described herein.

FIG. 6 is a flowchart of an example method 600 for conducting a block error rate assessment according to aspects described herein. The subject example method can be enacted by a network component, e.g., BLER assessment component 210, or a femto gateway node in a femto network platform or core network. At act 610, a sampling time is selected. The sampling time is a time interval during which information is collected on correct data blocks and erroneous data blocks communicated in packetized or switched voice call or a packetized data call or session. At act 620, for the selected sampling time, data or signaling on data blocks communicated without errors and data blocks communicated with errors is collected. At act 630, the collected data is aggregated for a set of femto access points, which maintain a voice or data call. The set of femto APs can include substantially all, or all, femto APs controlled by a set of one or more femto network management components (e.g., a femto cell gateway node(s)) in a femto network platform (e.g., platform 109). In an aspect of the subject innovation, the set of femto APs comprises a substantive number of elements, e.g., $10^4$-$10^9$. In an aspect, the collected data (e.g., UL/DL BLER data 203) are data samples determined at least in part by a call duration, as determined by a call model selected for BLER assessment purpose(s) in addition to the selected sampling time. For instance, in a call model in which the average hold time for a subscriber in a femto access point is 4 minutes, the volume of samples extracted from such femto access point is 240 sec/$\Delta\tau^{(S)}$, where $\Delta\tau^{(S)}$ is the selected sampling time. It should be appreciated that in voice calls, the volume of data samples is scaled, e.g., reduced, by a voice activity factor, which can depend at least on subscriber command of spoken language employed in the communication, nature of the voice call such as a brainstorming discussion or a prepared speech, or the like. At act 640, a set of block error rates (BLERs) is determined for data samples retained in the aggregated data. In an aspect, such determination can be performed through monitor component 218.

At act 650 a BLER report associated with determined BLERs for the aggregated data is generated for the aggregated data. The BLER report can summarize information over various periods of time; e.g., daily report, weekly report, monthly report, or substantially any time period (e.g., biweekly) for which BLER data is available. The BLER report can correlated BLER values with spatial and temporal degrees of freedom, e.g., location or time interval in a day in which data samples were generated. In addition, reports can include radio link conditions at the time data samples were collected. At act 660 the BLER report is conveyed. In an aspect, the BLER report can be conveyed to (i) other components functionally coupled with the network component that can enact the subject example method; (ii) a remote control center that assesses network performance, e.g., during a deployment stage of a network; (iii) an individual responsible for at least a portion of operation and maintenance of a femto network that includes the set of access points that provide the data that is aggregated. At act 670, the generated BLER report associated with the determined BLERs for the aggregated data is retained. In an aspect, the BLER report can be retained in a femto network platform, e.g., in a memory functionally connected to a femto gateway node.

Figure 7:
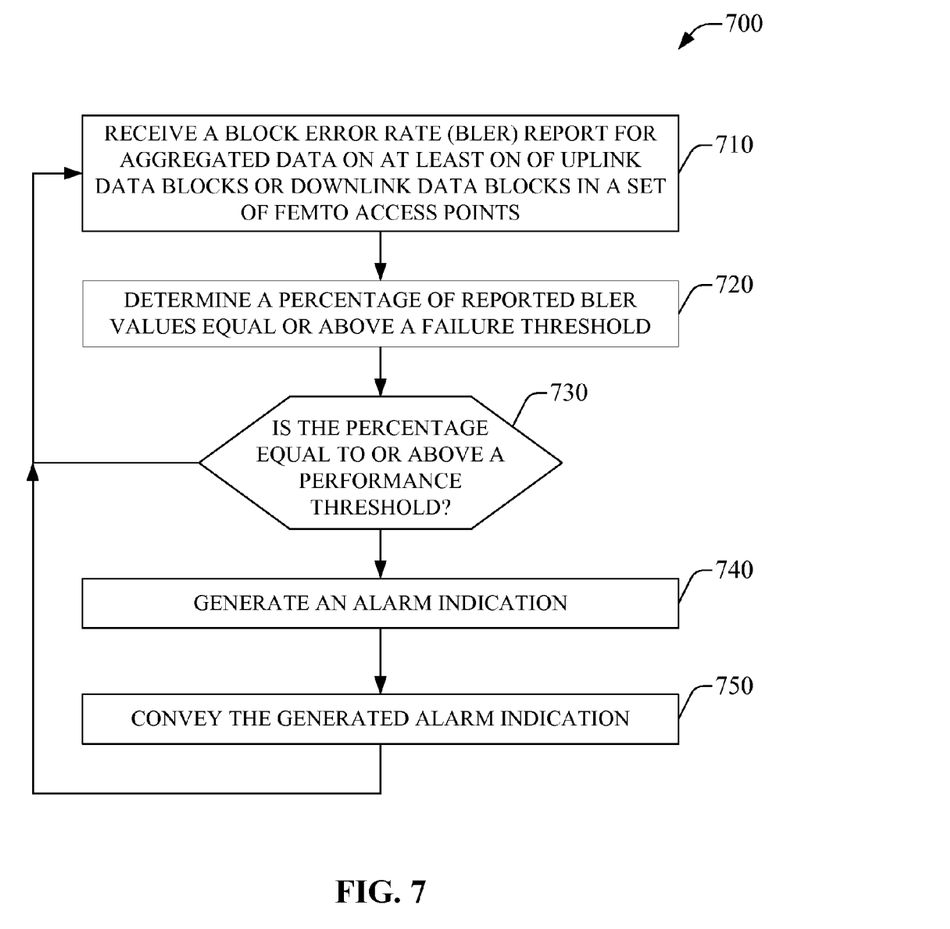
FIG. 7 presents a flowchart of an example method delivering an alarm related to BLER performance in a femto cell network according to aspects disclosed herein.

FIG. 7 presents a flowchart of an example method 700 delivering an alarm related to BLER performance in a femto cell network according to aspects disclosed herein. At act 710, a BLER report for aggregated data on at least one of uplink data blocks or downlink data blocks in a set of femto access points is received. At act 720, a percentage of reported BLER values equal or above a failure threshold is determined. The failure threshold applies to BLER values and can be statically or dynamically configured by a network operator. At act 730, it is probed whether the determined percentage is equal to or above a performance threshold (e.g., alarm threshold 421). It is to be noted that, in the subject innovation, performance threshold is assessed against a portion of reported BLER values originating from various femto APs in the set of femto APs, and it provides a boundary for satisfactory network operation. In turn, BLER failure threshold is an assessment layer that is "local" in that it determines whether BLER is satisfactory within a set of samples associated with communicated data. An affirmative outcome to act 730 leads to act 740 in which an alarm indication is generated, whereas a negative outcome directs flow to act 710. An alarm indication can be a set of multi-bit words, a graphical or audible token that can be conveyed in a user display interface, a short message service (SMS) communication, a multimedia message service (MMS) communication, an unstructured supplementary service data (USSD) message, an email message, an instant message, and so on. At act 750, the generated alarm is conveyed. An alarm can be conveyed to substantially any macro or femto network platform component for analysis (e.g., root-cause analysis) of operation conditions that led to a percentage of aggregated reported BLER equal or above performance threshold.

Figure 8:
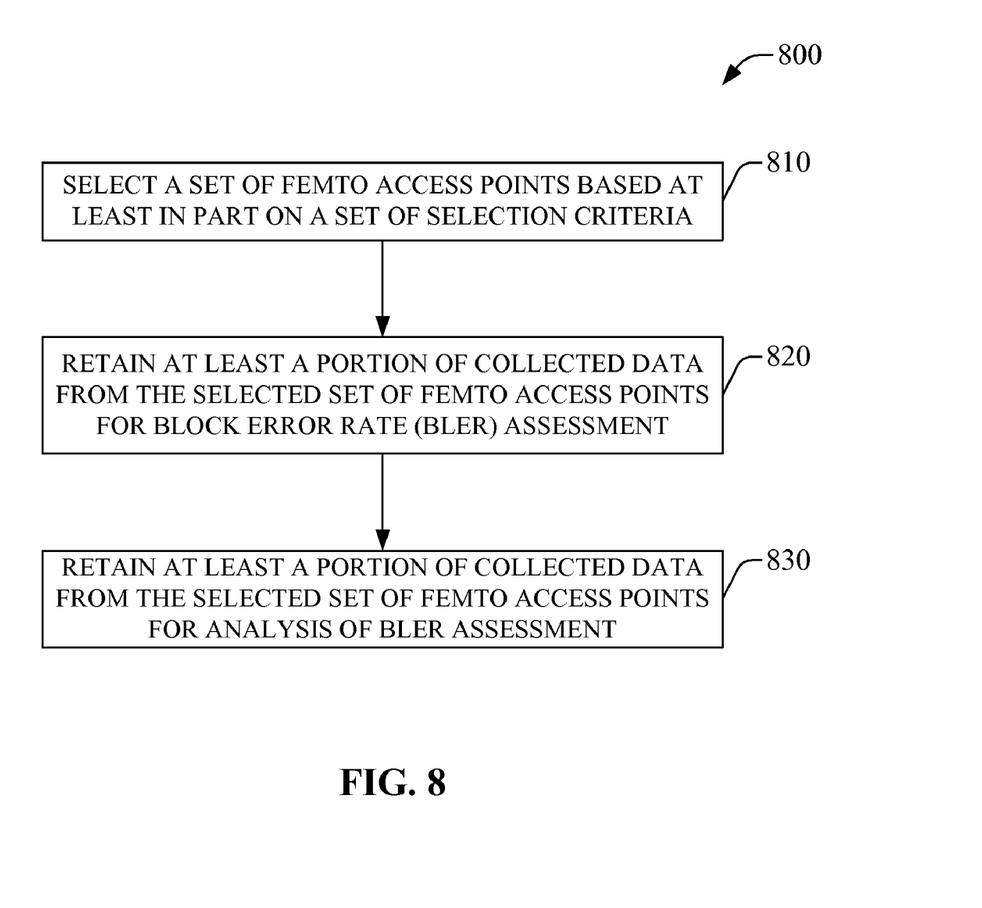
FIG. 8 presents a flowchart of an example method for aggregating collected data on data blocks communicated with and without error(s) for a set of femto cells according to aspects described herein.

FIG. 8 presents flowchart of example method 800 for aggregating collected data on data blocks communicated with and without error(s) for a set of femto cells according to aspects described herein. The subject example method can be enacted by a network component, e.g., BLER assessment component 210, or a femto gateway node in a femto network platform or core network. In an aspect, the subject example method 800 can be enacted in conjunction with example method 600. At act 810, a set of femto access points based at least in part on a set of selection criteria is selected. The set of criteria can include at least on of operational technology of femto APs; marketplace, e.g., served customer type, served application types, geographic location, of femto AP deployment; operational radio frequency (RF) bands in which a femto AP operates; interference environment(s) of a femto AP, e.g., femto APs in highly populated areas with high density of operating wireless devices; or the like. At act 820, at least a portion of collected data from the selected set of femto access points is retained for BLER assessment. At act 830, at least a portion of collected data from the selected set of femto access points is retained for analysis of BLER assessment.

Figure 9:
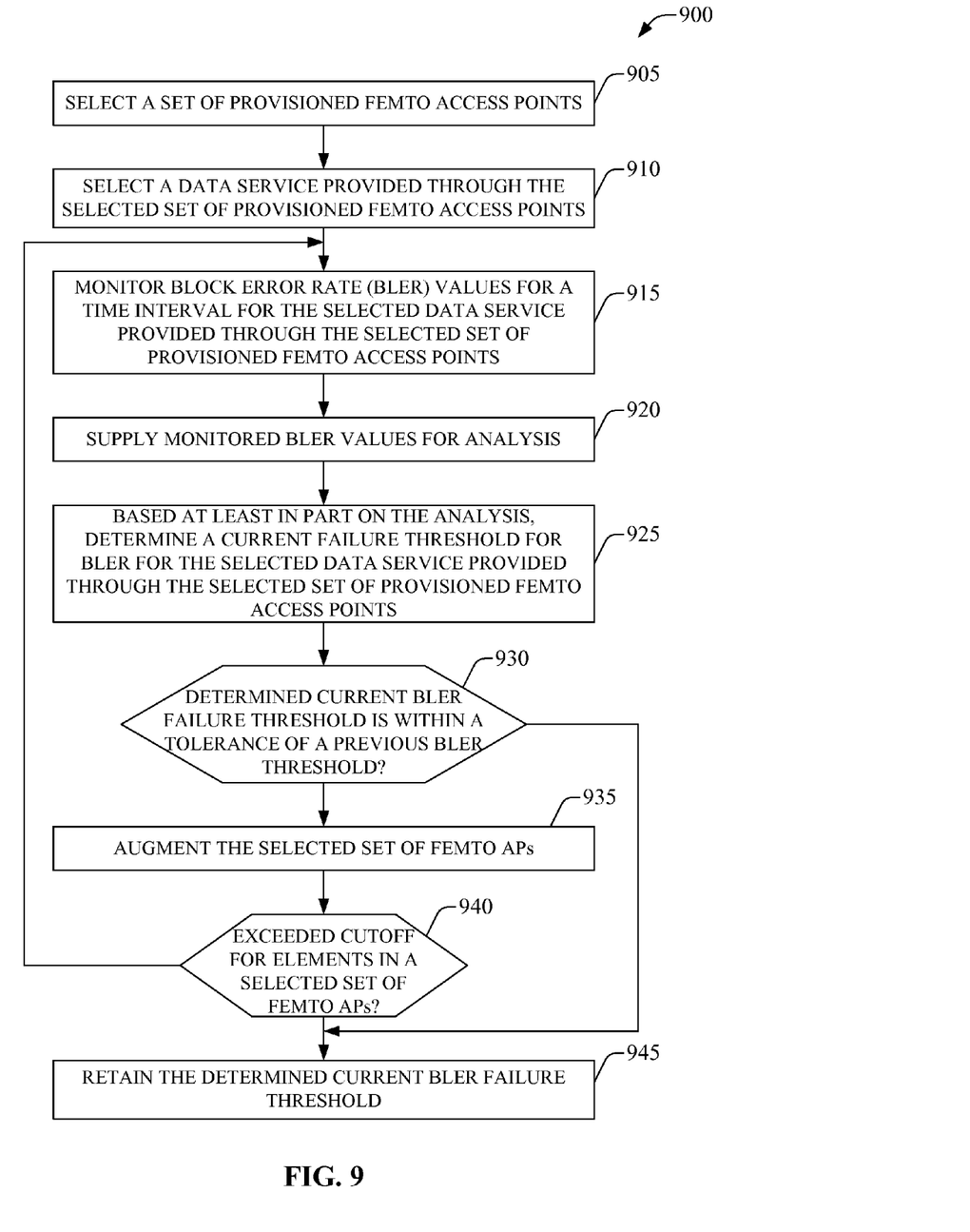
FIG. 9 is a flowchart of an example method for determining a BLER failure threshold in accordance with aspects described herein.

FIG. 9 is a flowchart of an example method 900 for determining a BLER failure threshold according to aspects described herein. At act 905, a set of provisioned femto access points is selected at 905. At act 910, a data service provided through the selected set of provisioned femto access points is selected. In an aspect, the selected service can be voice, or voice and data. At act 915, BLER values are monitored for a time interval for the selected data service provided through the selected set of provisioned femto access points. In an aspect, monitor component 218 can perform the monitoring. At act 920, monitored BLER values are supplied for analysis, which can include computation of statistics (e.g., average, variance and standard deviation, covariance matrices, or the like), and time and space correlations of collected data and correlations among collected data, and extraction of patterns or clusters within the collected data. At act 925, based at least in part on the analysis, a current failure threshold for BLER is determined for the selected data service provided through the selected set of provisioned femto access points. At act 930, it is checked whether a determined currently BLER failure threshold is within a tolerance of a previous BLER failure threshold. In an aspect, such tolerance can determine when a determination of BLER failure threshold has converged to a stable value that is characteristic of the selected set of femto access points. When the outcome of act 930 is positive, the determined currently BLER failure threshold is retained at act 945. As an example, the BLER failure threshold can be retained in a memory functionally coupled to femto gateway node(s). When the outcome of act 930 is negative, the selected set of femto access points is augmented at act 935, while at act 940 it is evaluated whether a cutoff for elements in a selected set of femto APs is exceeded; the cutoff value can be defined by a network operator, and it can depend on at least one of a marketplace, a technology employed by the femto APs within the set of femto APs, RF band(s) utilized for communication, or the like. In case that cutoff is not exceeded, flow is directed to act 915, and when the cutoff is exceeded, the determined current failure threshold is retained. It is noted that the selected set of femto APs that provides with the current BLER failure threshold that is converged can be taken as a set of femto APs for which data is aggregated.

Figure 10:
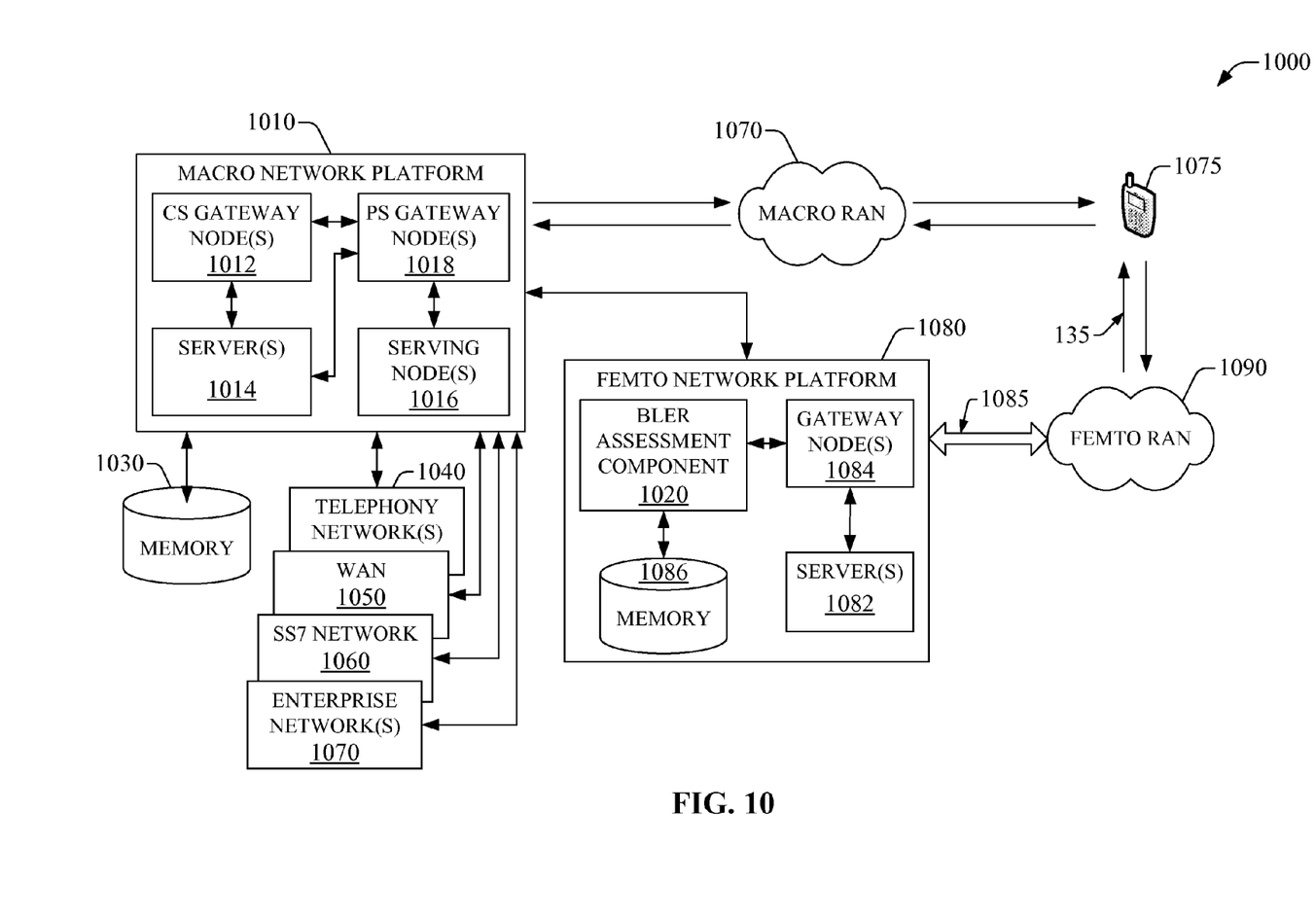
FIG. 10 illustrates an example wireless communication environment with associated components for operation of a femto cell in accordance with aspects described herein.

To provide further context for various aspects of the subject specification, FIG. 10 illustrates, respectively, an example wireless communication environment 1000, with associated components for operation of macro and femto cell networks, which can exploit various aspects described in the subject specification.

Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 3GPP UMTS, HSPA, 3GPP LTE, 3GPP2 UMB), macro network platform 1010 is embodied in a Core Network. (ii) A femto network platform 1080, which can provide communication with UE 1075 through a femto RAN 1090 linked to the femto network platform 1080 via backhaul pipe(s) 1085, wherein backhaul pipe(s) are substantially the same a backhaul link 140. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 105, while femto RAN 1090 can comprise multiple femto cell access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 218 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050, enterprise network(s) 1070 (e.g., enhanced 911); it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information, or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN 1050, or SS7 network 1060.

Regarding femto network platform 1080, it includes a femto gateway node(s) 1084, which have substantially the same functionality as PS gateway node(s) 1018. Additionally, femto gateway node(s) 1084 can also include substantially all functionality of serving node(s) 1016. Disparate gateway node(s) 1084 can control or operate disparate sets of deployed femto APs, which can be a part of femto RAN 1090. In an aspect of the subject innovation, femto gateway node(s) 1084 can aggregate operational data received from deployed femto APs. Moreover, femto gateway node(s) 1084, can convey received UL/DL BLER data to BLER assessment component 1020.

It is noted that BLER component 1020 can operate in accordance with aspects and features described in the subject specification in connection with BLER data component 210. It is noted that BLER assessment component 1020 can include aggregation component 214, monitor component 218, and report component 222. While illustrated as external to femto gateway node(s) 1084, it should be appreciated BLER assessment component 1020 can be an integral part of gateway node(s) 1084. In an aspect, BLER assessment component 1020 can receive operational data from gateway node(s) 1084, to evaluate BLER operational quality of deployed femto APs. BLER assessment component 1020 can exploit memory 1086 to store aggregated operational data, BLER reports, sampling times, and cache BLER data as well, in accordance with aspects described herein, that results from observation of received UL/DL BLER data.

As mentioned above, memory 1086 can comprise aggregated data and operational intelligence include. In addition, memory 1086 can include call models, aggregation criteria for femto access AP selection, alarm reports and alarm thresholds, etc., as described in the subject specification. Furthermore, memory 1086 can retain additional information relevant to operation of the various components of femto network platform 1080. For example, operational information that can be stored in memory 1086 can comprise, but is not limited to, subscriber intelligence; contracted services; maintenance and service records; femto cell configuration (e.g., devices served through femto RAN 1090; authorized subscribers associated with one or more deployed femto APs); service policies and specifications; privacy policies; add-on features; so forth.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. Furthermore, server(s) 1082 can effect provisioning of femto cell service, and effect operations and maintenance. It is to be noted that server(s) 1082 can include one or more processors configured to provide at least in part the functionality of femto network platform 1080. To that end, the one or more processors can execute code instructions stored in memory 1086, for example.

It is to be noted that aspects, features, or advantages of the subject innovation described in the subject specification can be exploited in substantially any wireless communication technology. For instance, Wi-Fi, WiMAX, Enhanced GPRS, 3GPP LTE, 3GPP2 UMB, 3GPP UMTS, HSPA, or Zigbee. Additionally, substantially all aspects of the subject innovation as disclosed in the subject specification can be exploited in legacy telecommunication technologies; e.g., GSM.

In addition, it is to be noted that the various aspects disclosed in the subject specification can also be implemented through program modules stored in a memory (e.g., memory 1086) and executed by a processor (e.g., processor 434), or other combination of hardware and software, or hardware and firmware.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method comprising:
   collecting first data related to data blocks communicated without errors for a sampling time and second data related to the data blocks communicated with errors for the sampling time;
   aggregating the first data and the second data into aggregated data;
   determining a set of block error rates for data samples in the aggregated data; and
   generating a block error rate report associated with the set of block error rates for the aggregated data.

2. The method of claim 1, further comprising receiving a plurality of data blocks for the sampling time across a femto access point.

3. The method of claim 1, further comprising retaining the block error rate report.

4. The method of claim 1, further comprising determining a percentage of the set of block error rates comprising values that are at least equal to a failure threshold.

5. The method of claim 4, further comprising generating an alarm indication in response to the percentage being at least equal to a performance threshold.

6. The method of claim 5, wherein the alarm indication is a set of multi-bit words.

7. The method of claim 5, further comprising conveying the alarm indication.

8. The method of claim 1, further comprising electing a set of femto access points based on the aggregated data.

9. The method of claim 8, further comprising retaining the aggregated data corresponding to the set of femto access points for the set of block error rates.

10. The method of claim 1, further comprising:
selecting a set of provisioned femto access points;
selecting a data service provided through the set of provisioned femto access points;
monitoring block error rate values during a time interval for the data service provided through the set of provisioned femto access points; and
supplying the block error rate for an analysis.

11. The method of claim 10, further comprising:
determining a failure threshold for the block error rate for the data service based on the analysis; and
retaining the block error rate failure threshold in response to the block error rate threshold being within a tolerance.

12. The method of claim 11, further comprising:
in response to the block error rate failure threshold being outside the tolerance, augmenting the set of femto access points into an augmented set of femto access points;
evaluating whether a cutoff for elements in the augmented set of femto access points is exceeded, and
retaining the block error rate failure threshold in response to the cutoff being exceeded.

13. A non-transitory computer-readable storage medium having instructions stored thereon that, when executed by a computing device, cause the computing device to carry out acts comprising:
collecting first data related to data blocks communicated without errors and second data related to the data blocks communicated with errors for a sampling time;
aggregating the first data and the second data into an aggregated data;
determining a set of block error rates corresponding to a set of femto points based on aggregated data;
generating a block error rate report for the set of femto points;
determining a percentage of block error rate values for the set of femto points at least equal to a failure threshold; and
generating an alarm indication when the percentage is at least equal to a performance threshold.

14. A system comprising:
a component configured to collect first data related to data blocks communicated without errors and second data related to the data blocks communicated with errors for a sampling time from a set of femto access points;
an aggregation component configured to aggregate the first data and the second data from the set of femto access points into an aggregated data;
a monitor component configured to monitor the aggregated data and to generate a set of block error rates for the set of femto points based on the aggregated data; and
a report component configured to produce a block error rate report for the set of femto access points based in the block error rates and values associated with the block error rates.

15. The system of claim 14, further comprising a component configured to receive the data blocks from a femto access point within the set of femto access points.

16. The system of claim 14, wherein the monitor component is configured to monitor the aggregated data in real time, and the report component is configured to generates the block error rate report as a data stream.

17. The system of claim 14, wherein the monitor component is configured to process the aggregated data in a scheduled manner via an evaluation of parcels of the aggregated data corresponding to specific time intervals.

18. The system of claim 17, wherein the set of femto access points is selected based on a set of criteria.

19. The system of claim 18, wherein the set of femto access points are selected in a manner providing statistically representative data on communicated data blocks for a femto network.

20. The system of claim 14, wherein the set of femto access points are selected in a random fashion, with the femto access points in the set of femto access points have at least nearly mutually orthogonal operation patterns.

21. The system of claim 14, wherein the set of femto access points are selected in accordance with a directed selection including femto access points that present substantial overlap in operational metrics.

22. The system of claim 14, wherein the aggregated data includes a cyclic redundancy check value.

23. The system of claim 14, further comprising an alarm component configured to generate an alarm indication based on the block error rate.

24. The system of claim 23, wherein the alarm component is configured to exploit a failure threshold for values of the block error rate and a performance threshold for the aggregated data.

25. The system of claim 14, the set of femto access points are selected in accordance with a directed selection including femto access points that present substantial overlap in service metrics.

* * * * *